US009304788B2

(12) United States Patent
Yu

(10) Patent No.: US 9,304,788 B2
(45) Date of Patent: Apr. 5, 2016

(54) ELECTRONIC DEVICE, CONFIGURABLE COMPONENT AND CONFIGURATION INFORMATION STORAGE METHOD THEREOF

(75) Inventor: Xinlai Yu, Beijing (CN)

(73) Assignees: LENOVO (BEIJING) LIMITED, Beijing (CN); BEIJING LENOVO SOFTWARE LTD., Beijing (CN)

(*) Notice: Subject to any disclaimer, the term of this patent is extended or adjusted under 35 U.S.C. 154(b) by 601 days.

(21) Appl. No.: 13/637,118

(22) PCT Filed: Feb. 25, 2011

(86) PCT No.: PCT/CN2011/000304
§ 371 (c)(1),
(2), (4) Date: Sep. 25, 2012

(87) PCT Pub. No.: WO2011/116621
PCT Pub. Date: Sep. 29, 2011

(65) Prior Publication Data
US 2013/0024678 A1 Jan. 24, 2013

(30) Foreign Application Priority Data

Mar. 26, 2010 (CN) .......................... 2010 1 0136073

(51) Int. Cl.
*G06F 9/24* (2006.01)
*G06F 15/177* (2006.01)
*G06F 9/00* (2006.01)
(Continued)

(52) U.S. Cl.
CPC .............. *G06F 9/44505* (2013.01); *G06F 8/51* (2013.01); *G06F 9/4411* (2013.01); *H04L 41/0806* (2013.01); *H04L 41/0813* (2013.01); *G06F 8/665* (2013.01); *G06F 9/24* (2013.01);
(Continued)

(58) Field of Classification Search
None
See application file for complete search history.

(56) References Cited

U.S. PATENT DOCUMENTS 6,012,103 A * 1/2000 Sartore et al. ..................... 710/8
7,424,603 B2 9/2008 Brannock et al.
(Continued)

FOREIGN PATENT DOCUMENTS

| CN | 1455342 A | 11/2003 |
| CN | 1890633 A | 1/2007 |
| CN | 101090344 A | 12/2007 |

OTHER PUBLICATIONS

International Search Report for International Application No. PCT/CN2011/000304, date of mailing Jun. 9, 2011.

*Primary Examiner* — Ji H Bae

(57) ABSTRACT

Provided are an electronic device, a configurable component and a configuration information storage method thereof, which are employed for meeting the storage requirements of the configuration information for the configurable component of the electronic device. The method comprises that: obtaining the initial configuration information for the component of the electronic device (S110); employing the initial configuration information as the default configuration information for the component and compiling it into the Basis Input Output System (BIOS) of the electronic device (S120); when the device is powered on, the BIOS stores the default configuration information into the storage medium of the mainboard of the electronic device (S130). Compared with the prior art, the storing and loading of configuration parameters are controlled and implemented by the BIOS without special EEPROM or E-fuse memory, so there is no need to add other hardware additionally and the cost is reduced.

6 Claims, 6 Drawing Sheets

(51) Int. Cl.
*G06F 3/00* (2006.01)
*G06F 13/12* (2006.01)
*G06F 9/445* (2006.01)
*G06F 9/45* (2006.01)
*H04L 12/24* (2006.01)
*G06F 9/44* (2006.01)
*G06F 13/10* (2006.01)

(52) U.S. Cl.
CPC ............... *G06F9/4401* (2013.01); *G06F 13/10* (2013.01); *H04L 41/0803* (2013.01)

(56) References Cited

U.S. PATENT DOCUMENTS

| | | | |
|---|---|---|---|
| 2002/0129272 A1* | 9/2002 | Terrell et al. | 713/201 |
| 2005/0038981 A1* | 2/2005 | Connor et al. | 713/1 |
| 2006/0020844 A1* | 1/2006 | Gibbons et al. | 714/2 |
| 2007/0162733 A1 | 7/2007 | Dennis et al. | |
| 2007/0245038 A1* | 10/2007 | Lu | 710/8 |
| 2008/0222385 A1* | 9/2008 | Hsu | 711/207 |
| 2009/0327682 A1* | 12/2009 | Liu | 713/2 |
| 2011/0208955 A1* | 8/2011 | Anbazhagan et al. | 713/2 |

* cited by examiner

ELECTRONIC DEVICE, CONFIGURABLE COMPONENT AND CONFIGURATION INFORMATION STORAGE METHOD THEREOF

FIELD OF INVENTION

The present invention relates to an electronic technique, especially to an electronic device, a configurable component and a method of storing the configuration information thereof.

DESCRIPTION OF PRIOR ART

At present, a configurable component (such as a network card, etc.) of the electronic device system such as a computer needs an Electrically Erasable Programmable Read Only Memory (EEPROM) to store the configuration information. Taking a network card of a computer as an example, the configuration information comprises an MAC address of the network card and other configuration parameters related to booting. During a startup process of a computer, the configuration parameters in the EEPROM are loaded to the configuration space of the network card to complete the configuration of the operating state of the network card.

In the prior art, one-time-programming device such as E-fuse memory is employed in the configurable component such as the network card to replace the EEPROM, so as to reduce cost.

During the process of implementing the present invention, the inventors find there are at least the following issues in the prior art:
(1) The E-fusWe belongs to a one-time-programming memory. When the user calls a configuration interface of the component to perform a configuring operation during a stage of power on self test (POST) of the electronic device, the spare valid bits of the E-fuse are reduced. If the user operates a little more times, the remaining valid bits of the E-fuse will be rapidly reduced to 0 and can't continue to configure.
(2) Although the E-fuse memory can replace the EEPROM to complete the storage of the configuration information on the component, the E-fuse memory itself still has a higher cost.

SUMMARY OF THE INVENTION

The technical problem to be solved by the present invention is to provide an electronic device to meet the storage requirement of the configuration information for the configurable component applied to the electronic device.

In order to solve the above mentioned technical problem, the present invention provides a method of storing configuration information for a configurable component, the configurable component being applied to an electronic device and being configured in functionality, which comprises steps of:
obtaining initial configuration information for the component of the electronic device;
employing the initial configuration information as the default configuration information for the component and compiling it into the Basis Input Output System (BIOS) of the electronic device; and
the BIOS storing the compiled default configuration information into the storage medium of the mainboard of the electronic device when the device is powered on for the first time.

Preferably, the component comprises an option read-only memory and the method further comprises that when the electronic device is powered on once again, the option read-only memory of the component obtains the compiled default configuration information from the storage medium of the mainboard by the BIOS and loads the default configuration information to the component through the input/output address of the component.

Preferably, the method further comprises that when the electronic device is powered on once again, the BIOS obtains the default configuration information from the storage medium of the mainboard, and loads the default configuration information to the component through the input/output address of the component.

Preferably, the method further comprises that when the user updates the configuration information for the component through the option read-only memory of the component, the BIOS stores the updated configuration information to the storage medium of the mainboard according to the calling of the option read-only memory.

Preferably, the method further comprises that when the user updates the configuration information for the component through the option read-only memory of the component, the BIOS obtains the updated configuration information according to the input/output address of the component, and stores the updated configuration information to the storage medium of the mainboard.

Preferably, the method comprises that the input/output address is obtained when the initial configuration information is obtained; and the input/output address along with the default configuration information are compiled to the BIOS.

Preferably, the BIOS stores the default configuration information to the storage medium of the mainboard according to the standard interruption or the system managed interruption.

Another technical problem to be solved by the present invention is to provide a configurable component to meet the storage requirement of the configuration information for the component.

In order to solve the above mentioned technical problem, the present invention provides an electronic device including a function-configurable component, wherein the electronic device comprises:
means for obtaining the initial configuration information for the component;
means for employing the initial configuration information as the default configuration information for the component and compiling it into a Basis Input Output System (BIOS) of the electronic device;
the BIOS for storing the compiled default configuration information into the storage medium of the mainboard of the electronic device when the device is powered on for the first time; and
storage medium of the mainboard for storing the default configuration information.

Preferably, the electronic device further comprises an option read-only memory of the component for obtaining the default configuration information from the storage medium of the mainboard by the BIOS when the electronic device is powered on again.

Preferably, when the electronic device is powered on again, the BIOS obtains the default configuration information from the storage medium of the mainboard, and the read-only memory of the component loads the default configuration information to the component through the input/output address of the component.

Preferably, the electronic device further comprises an option read-only memory for calling the BIOS when the user updates the configuration information for the component, and the BIOS stores the updated configuration information to the storage medium of the mainboard according to the calling of the option read-only memory.

Preferably, when the user updates the configuration information for the component, the BIOS obtains the updated configuration information according to the input/output address of the component, and stores the updated configuration information to the storage medium of the mainboard.

Preferably, when the means for obtaining obtains the initial configuration information, the input/output address is obtained, the updated configuration information is obtained according to the input/output address, and the updated configuration information is stored to the storage medium of the mainboard; and the means for compiling compiles the input/output address along with the default configuration information to the BIOS.

Another technical problem to be solved by the present invention is to provide a method of storing configuration information of a configurable component to meet the storage requirement of the configuration information for the component.

In order to solve the above mentioned technical problem, the present invention provides a function-configurable component, the component being applied to the electronic device, the electronic device including BIOS, and the mainboard of the electronic device being provided with a storage medium, wherein the component comprising an option read-only memory, wherein:
the option read-only memory for obtaining the default configuration information of the component from the storage medium through BIOS when the electronic device is started up; and
the component for loading the default configuration information according to its own input/output address.

Preferably, the option read-only memory is further used to update the configuration information for the component by the user and to call the BIOS after the user updates the configuration information for the component; and the BIOS is further used to store the updated configuration information to the storage medium.

In order to solve the above mentioned technical problem, the present invention also provides a function-configurable component, the component being applied to an electronic device, the electronic device including BIOS, and the mainboard of the electronic device being provided with a storage medium, wherein:
the component is used to load the default configuration information according to its own input/output address and BIOS after the electronic device is started up;
wherein the BIOS is used to obtain the default configuration information from the storage medium after the electronic device is started up.

Preferably, the component further comprises an option read-only memory for further updating the configuration information for the component by the user and for calling the BIOS after the user updates the configuration information for the component;
wherein the BIOS is further used to store the updated configuration information to the storage medium according to the calling of the option read-only memory.

Compared with the prior art, one embodiment of the present invention at least has the following technical effect: the network card of a computer does not need a special EEPROM or E-fuse memory; the storing and loading of the network card configuration parameters are controlled and implemented by the service function of the BIOS, so there is no need to add other hardware additionally and the cost is reduced; and the circuit design of the mainboard is simplified, there is not any storage device such as EEPROM or E-fuse memory, and the line design of the mainboard is simplified and the space is extended.

The other characters and advantages of the present invention will be illustrated in the subsequent description and will be at partially apparent from the description or be understood by implementing the present invention. The objective and other advantages of the present invention may be implemented and obtained by the specially indicated structure in the specification, claims and the accompany figures.

BRIEF DESCRIPTION OF THE DRAWINGS

The accompany figures are provided to further understand the present invention and are consisted of a part of the specification, which is used to explain the present invention along with the embodiments of the present invention without limiting the present invention, in which.

DETAILED DESCRIPTION OF PREFERRED EMBODIMENTS

Figure 1:
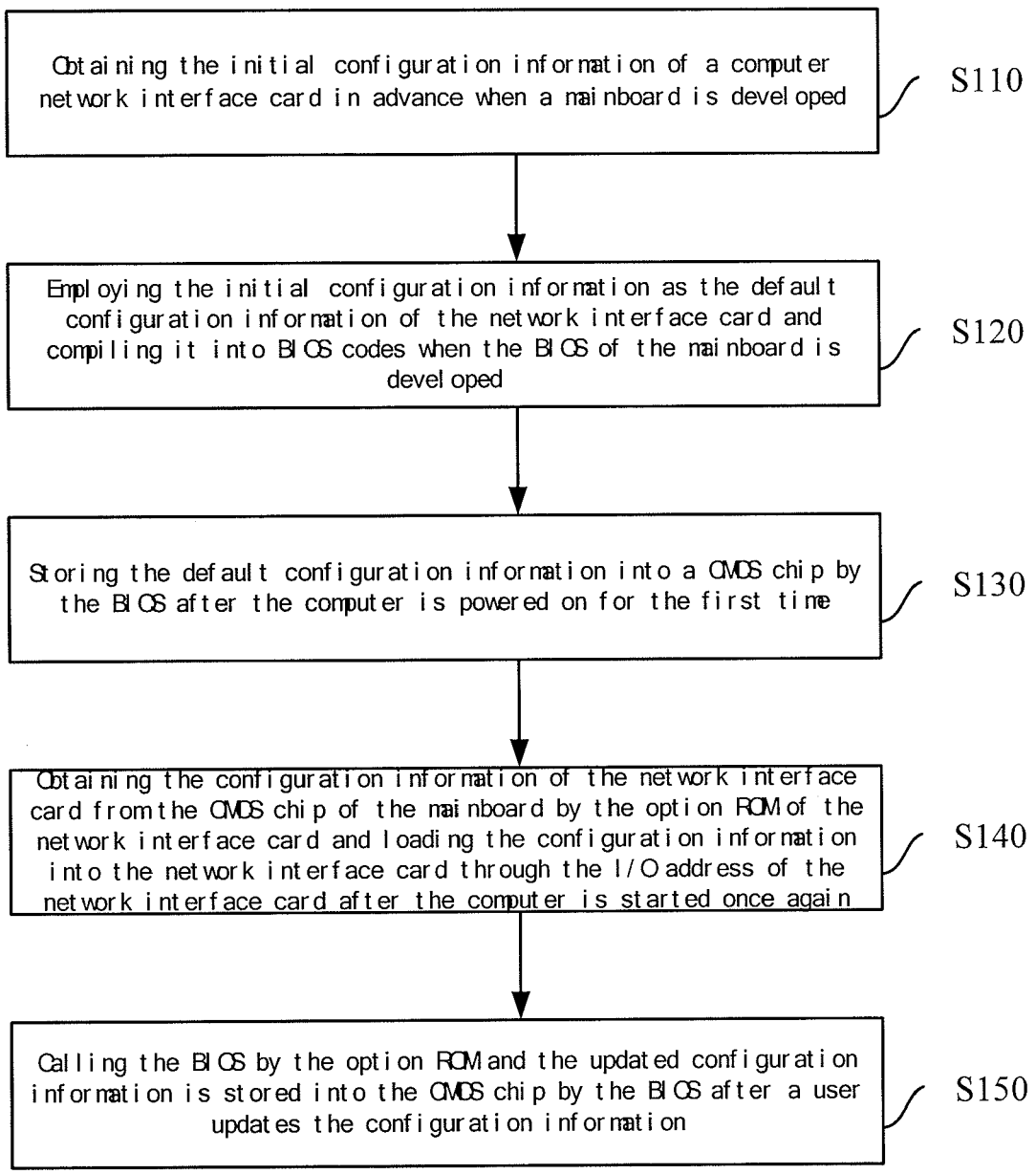
FIG. 1 is a schematic view of the flowchart of the first embodiment of the storage method according to the present invention.

The embodiment of the present invention will be illustrated in detail in conjunction with the accompany figures and the following embodiments, by way of which it can be completely understood and implemented how to solve the technical problem by applying the technical means and how to achieve the technical effect.

It should not be noted that the embodiment of the present invention and various features of the embodiments can be combined with each other without confliction, which falls into the scope of the present invention. In addition, the steps shown in the flowchart of the accompany figures may be executed in the computer system for a set up computer executable instructions; and although the logic sequence is shown in the flowchart, the shown or described steps may be implemented in an order different from that of this situation in some case.

A long time ago, the cost of the EEPROM external to the configurable component (e.g. a network card) contributes a small part to the cost of the whole electronic device (e.g. a computer). Taking the network card on the computer as an example, the network card on the commercial computer product is always designed by employing an external EEPROM. At present during which the profit and cost of the computer industry are sensitive more and more and the competition of various designs and production manufactures are increasingly impetuous, it is very important especially for the computer product manufactures how to save the cost of the computer system. Thus, it imposes a different meaning to save the EEPROM external to the component, and such a saving may affect the product cost of the mainboard on the electronic device. Thus, it is valuable for the electronic device design and product manufactures to find a method for saving EEPROM without adding extra cost.

The basic idea of the present invention is to employ the existing storage medium on the mainboard of the electronic device to replace the EEPROM to implement the storage of the configuration information, and to implement the updated storage of the configuration information for the component by constructing a transmitting channel from the component chip to the storage medium of the mainboard with BIOS of the electronic device. Taking the network card chip as an example, due to the operating principle among the network card chip, the option read-only memory of the network card and the EEPROM external to the network card, it is impossible to ensure the existing network card operates normally if only a piece of space is found on the mainboard to replace the EEPROM, because the network card chip and the option read-only memory of the network card do not know where the existing configuration information is stored and how to read and update the configuration information at all. The technical solution of the present invention is to provide a function of operation service by BIOS and to store the configuration information for the network card by employing the existing storage medium of the mainboard under cooperation with the network card chip and the option read-only memory of the network card.

By introducing the basic level function of BIOS, the operations of storing, loading and updating the configuration information in the following different modes may be implemented according to the actual applications:

(1) it is implemented by enhancing the BIOS service function, e.g. by the option read-only memory calling the BIOS service function to read and write the existing storage medium of the mainboard. When the network card is configured during leaving factory, configuration information for a network card is stored in the existing storage medium of the mainboard by BIOS or other approaches. When the computer is powered on, the option read-only memory of the network card obtains the configuration information for the network card stored on the mainboard by BIOS and the configuration information is loaded to the network card chip. During the process of use, after the user updates the configuration information for the network card, the option read-only memory stores the updated configuration information to the existing storage medium of the mainboard by BIOS. In this mode, the option read-only memory actively calls the BIOS service to obtain the configuration information and updates the configuration information, and the BIOS only provide a service function interface for obtaining and updating.

(2) it is implemented by modifying BIOS, e.g. by the BIOS directly reading and writing the existing storage medium of the mainboard. When the network card is configured during leaving factory, configuration information for the network card is stored in the existing storage medium of the mainboard. The developers obtain the I/O address of the network card chip in advance, and compile the I/O address to the BIOS. When the computer is powered on, the BIOS directly loads the configuration information for the network card stored in the existing storage medium of the mainboard to the network card chip through the I/O address of the network card chip, and may accept the user's updating. In case of that the configuration information for the network card is updated, after the option read-only memory of the network card runs, the BIOS obtains the updated configuration information from the network card chip and stores the updated configuration information to the existing storage medium of the mainboard. As compared with the mode (1) mentioned above, the BIOS more actively obtains or stores, without waiting for the calling from the option read-only memory.

In the first implementation (1) mentioned above, it may be implemented by enhancing the service function of the BIOS. The service function may be for example a standard interruption, and may also be a system managed interruption (SMI).

It should be noted that in the above mentioned two implementations, it is exemplified by taking the network card in a computer as an example. The above mentioned implementation and the following embodiments of the present invention are not limited to a computer network card. A component which stores configuration information by an external memory and the configuration information of which is capable of being configured are all applicable to the basic idea and technical solution of the present invention.

FIG. 1 is a schematic view of the flowchart of the first embodiment of the method according to the present invention. The first embodiment of the present method employs the mode (1) mentioned above and selects a Complementary Metal-Oxide-Semiconductor (CMOS) chip as a storage medium of the mainboard to store and update the configuration information for the network card. As shown in FIG. 1, the first embodiment of the present method comprises the following steps:

a step of S110, when the mainboard is developed, the initial configuration information for the computer network card is obtained in advance, e.g. the default configuration information during leaving factory obtained from the computer network card vendors and so on;

a step of S120, when the BIOS of the mainboard is developed, the initial configuration information obtained in advance is compiled as a default configuration information for the network card into the BIOS code; the BIOS stores the default configuration information to the BIOS code when compiling; and during the process of BIOS running when the computer is powered on for the first time, the default configuration information in the code is stored to the storage medium of the mainboard;

a step of S130, after the computer is powered on for the first time, the BIOS stores the default configuration information which is compiled into the BIOS code to the storage medium of the mainboard, i.e. the Complementary Metal-Oxide-Semiconductor chip of the mainboard of the computer;

a step of S140, after the computer is started up once again (including every time after the computer is powered on for the first time), the option read-only memory of the network card obtains the configuration information for the network card from the CMOS chip in the mainboard by a BIOS service function and loads the configuration information to the network card chip through an I/O address of the network card chip; and a step of S150, after the user updates the configuration information for the network card by a network card configuration interface provided by the option read-only memory, the option read-only memory calls the BIOS and takes the updated configuration information as the inlet parameters for the BIOS; and the BIOS stores the updated configuration information to the CMOS chip of the mainboard to be selected to load the next time the computer starts up.

It should be noted that after the computer is powered on, the computer will acquiescently load the configuration information stored in the CMOS chip if the user does not updates the configuration information for the network card through the configuration interface. If the user updates it, the step S130 of updating the configuration information is performed. Among others, the configuration information stored in the CMOS chip may be the default configuration information for the network card during leaving factory in the BIOS, or may be the configuration information updated by the user some times. In addition, since the CMOS chip has a storage space of several bytes just like a flash chip, the default configuration information during leaving factory and the configuration information updated when running may coexist. The BIOS may dynastically judge the status of the whole computer and in turn determines which configuration information will be loaded. For example, when it is used for the first time after leaving factory, the BIOS loads the default configuration information during leaving factory; when a user's updating occurs during a process of use, the BIOS loads the configuration information which is updated by the user; and when the computer takes place some error or calls the service of the BIOS through the operating system, the BIOS may be recovered to load the default configuration information during leaving factory. Thus, this makes the whole system more flexible and intelligent.

Figure 2:
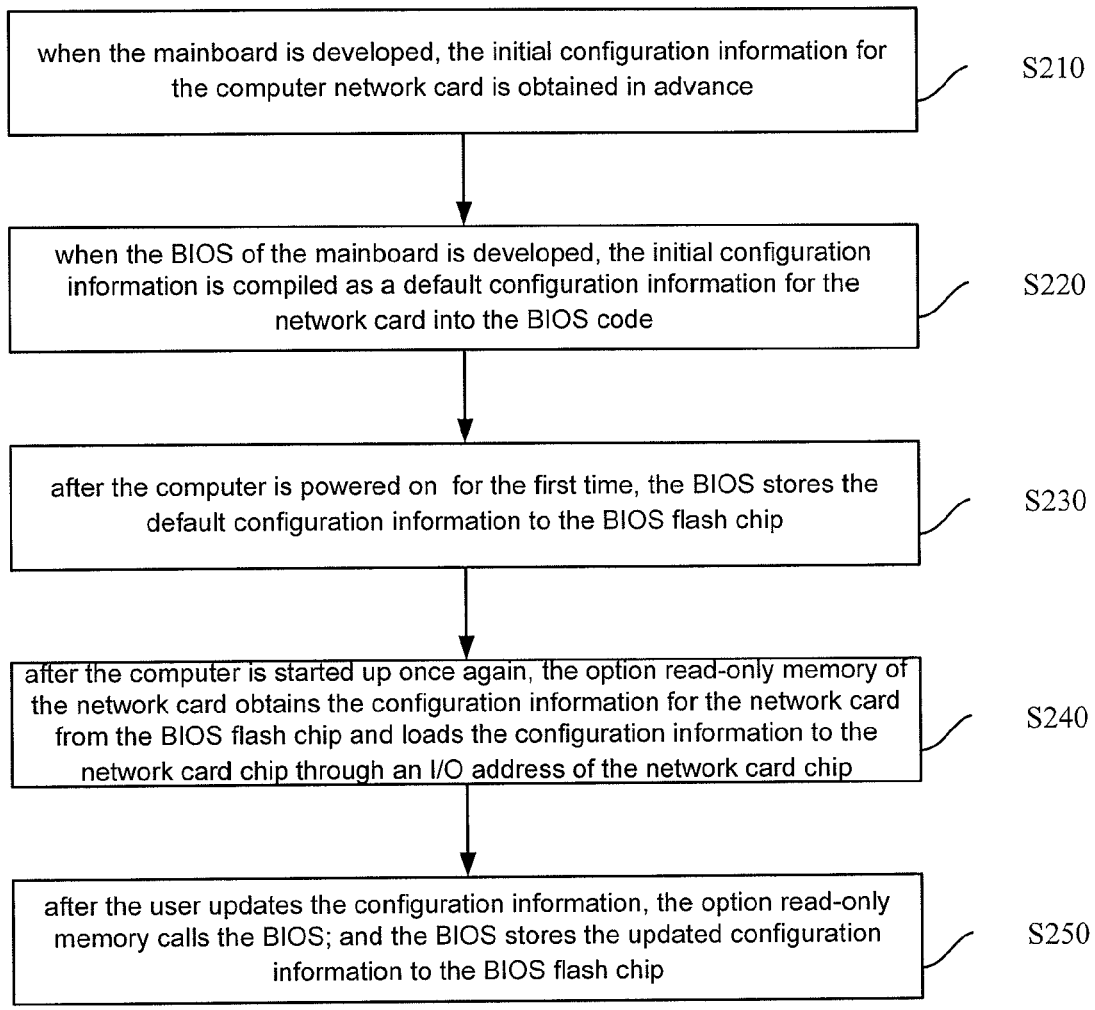
FIG. 2 is a schematic view of the flowchart of the second embodiment of the storage method according to the present invention.

The second embodiment of the present method employs the mode (1) mentioned above and selects a BIOS flash as a storage medium of the mainboard to store the configuration information for the network card. FIG. 2 is a schematic view of the flowchart of the second embodiment of the method according to the present invention. As shown in FIG. 2, the second embodiment of the present method primarily comprises the following steps:

a step of S210, when the mainboard is developed, the initial configuration information for the computer network card is obtained in advance, e.g. the default configuration information during leaving factory obtained from the computer network card vendors and so on;

a step of S220, when the BIOS of the mainboard is developed, the initial configuration information obtained in advance is compiled as a default configuration information for the network card into the BIOS code; the BIOS stores the default configuration information to the BIOS code when compiling; and during the process of BIOS running when the computer is powered on for the first time, the default configuration information in the code is stored to the storage medium of the mainboard;

a step of S230, after the computer is powered on to operate for the first time, the BIOS stores the default configuration information which is compiled into the BIOS code to the storage medium of the mainboard, i.e. the BIOS flash chip;

a step of S240, after the computer is started up once again (including every time after the computer is powered on for the first time), the option read-only memory of the network card obtains the configuration information for the network card from the BIOS flash chip by a BIOS service function and loads the configuration information to the network card chip through an I/O address of the network card chip; and a step of S250, after the user updates the configuration information for the network card by a network card configuration interface provided by the option read-only memory, the option read-only memory calls the BIOS and takes the updated configuration information as the inlet parameters; and the BIOS stores the updated configuration information to the BIOS flash chip to be selected to load the next time the computer starts up.

Figure 3:
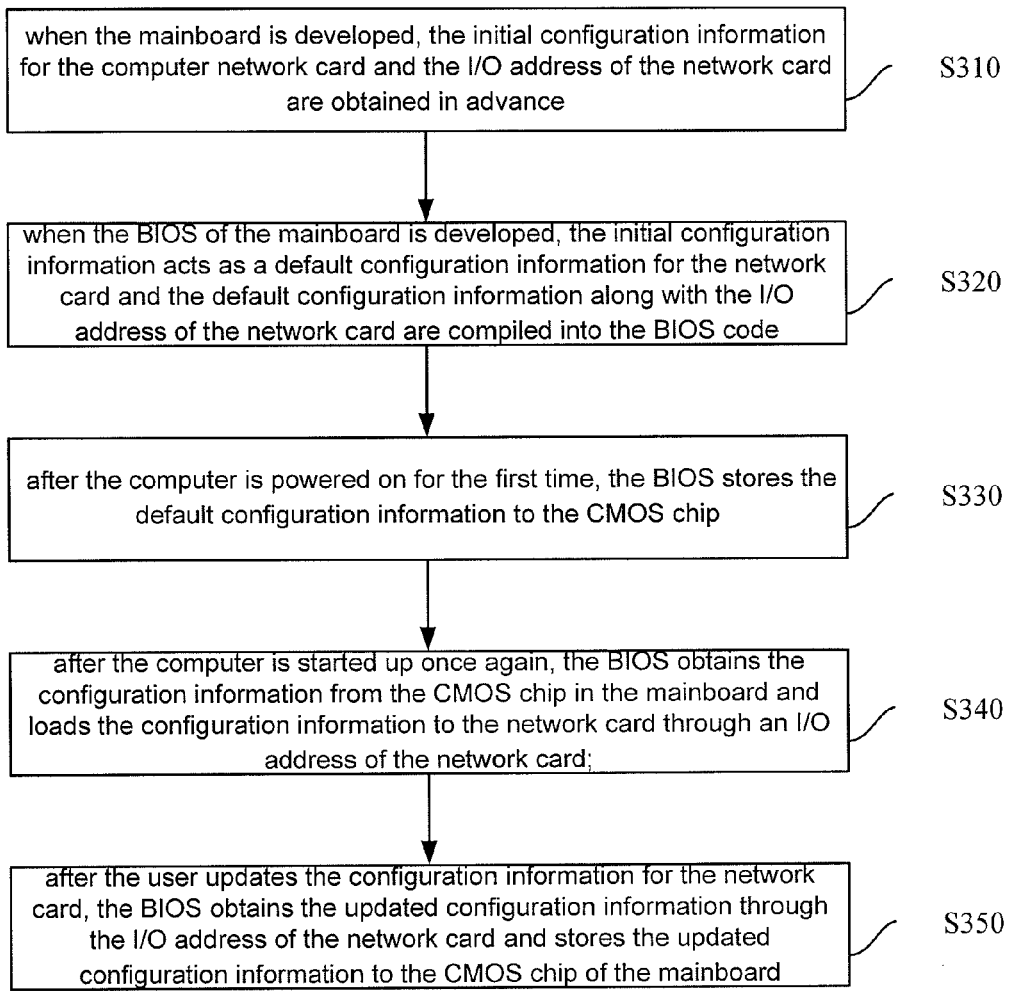
FIG. 3 is a schematic view of the flowchart of the third embodiment of the storage method according to the present invention.

FIG. 3 is a schematic view of the flowchart of the third embodiment of the method according to the present invention. The third embodiment of the present method employs the mode (2) mentioned above and selects a CMOS chip as a storage medium of the mainboard to store and update the configuration information for the network card. As shown in FIG. 3, the third embodiment of the present method comprises the following steps:

a step of S310, when the mainboard is developed, the initial configuration information for the computer network card and the I/O address of the network card chip are obtained in advance, e.g. the initial configuration information may be the default configuration information during leaving factory obtained from the computer network card vendors and so on;

a step of S320, when the BIOS of the mainboard is developed, the initial configuration information obtained in advance acts as a default configuration information for the network card and the default configuration information along with the I/O address of the network card are compiled into the BIOS code; the BIOS stores the default configuration information to the BIOS code when compiling; and during the process of BIOS running when the computer is powered on for the first time, the default configuration information in the code is stored to the storage medium of the mainboard;

a step of S330, after the computer is powered on for the first time, the BIOS stores the default configuration information which is compiled into the BIOS code to the storage medium of the mainboard, i.e. the CMOS chip of the mainboard of the computer;

a step of S340, after the computer is started up once again (including every time after the computer is powered on for the first time), the BIOS obtains the configuration information for the network card from the CMOS chip in the mainboard and loads the configuration information to the network card chip through an I/O address of the network card chip; and a step of S350, after the user updates the configuration information for the network card by a network card configuration interface provided by the option read-only memory, the BIOS obtains the updated configuration information through the I/O address of the network card chip and stores the updated configuration information to the CMOS chip of the mainboard to be selected to load the next time the computer starts up.

Figure 4:
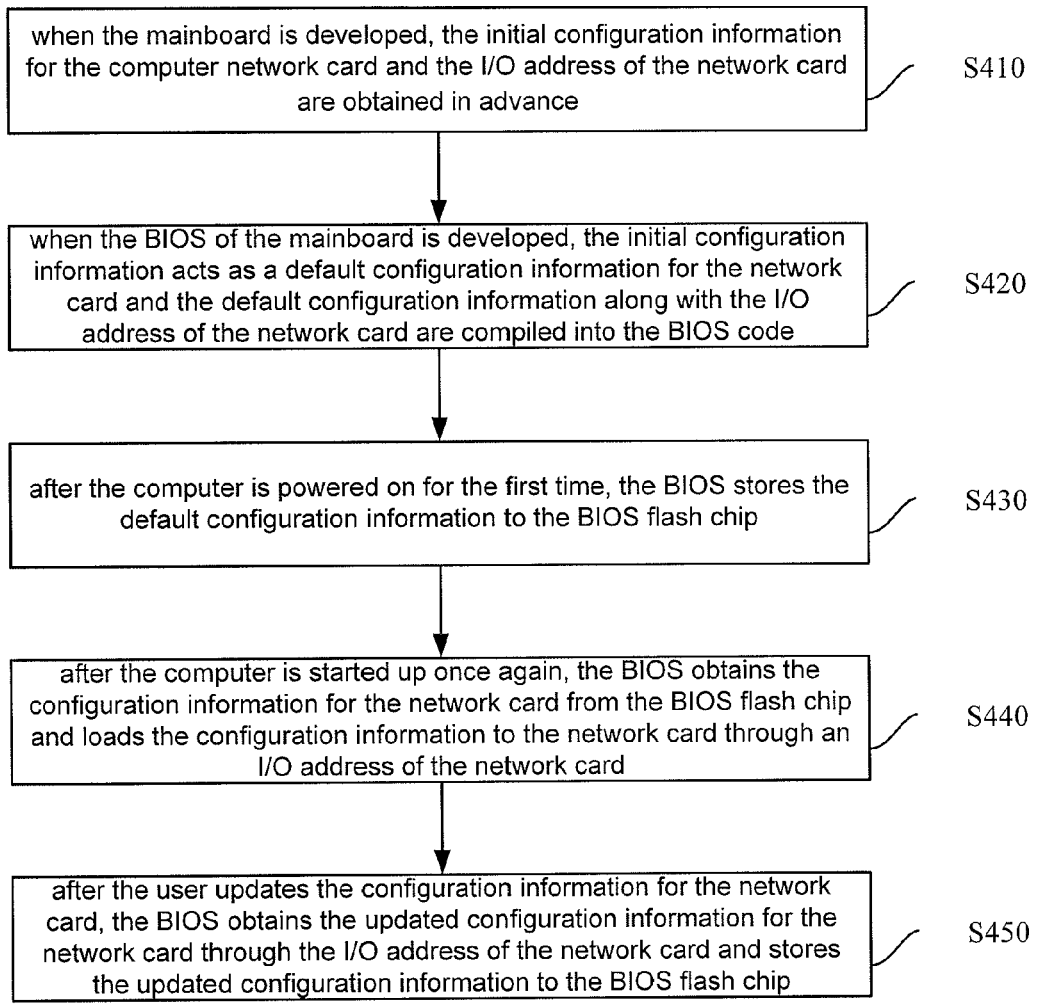
FIG. 4 is a schematic view of the flowchart of the fourth embodiment of the storage method according to the present invention.

FIG. 4 is a schematic view of the flowchart of the fourth embodiment of the method according to the present invention. The fourth embodiment of the present method employs the mode (2) mentioned above and selects a BIOS flash chip as a storage medium of the mainboard to store and update the configuration information for the network card. As shown in FIG. 4, the fourth embodiment of the present method comprises the following steps:

a step of S410, when the mainboard is developed, the initial configuration information for the computer network card and the I/O address of the network card chip are obtained in advance, e.g. the initial configuration information may be the default configuration information during leaving factory obtained from the computer network card vendors and so on;

a step of S420, when the BIOS of the mainboard is developed, the initial configuration information obtained in advance acts as a default configuration information for the network card and the default configuration information along with the I/O address of the network card are compiled into the BIOS code; the BIOS stores the default configuration information to the BIOS code when compiling; and during the process of BIOS running when the computer is powered on for the first time, the default configuration information in the code is stored to the storage medium of the mainboard;

a step of S430, after the computer is powered on to operate for the first time, the BIOS stores the default configuration information compiled to the BIOS code to the storage medium of the mainboard, i.e. the BIOS flash chip;

a step of S440, after the computer is started up once again (including every time after the computer is powered on for the first time), the BIOS obtains the configuration information for the network card from the BIOS flash chip and loads the configuration information to the network card chip through an I/O address of the network card chip; and a step of S450, after the user updates the configuration information for the network card by a network card configuration interface provided by the option read-only memory, the BIOS obtains the updated configuration information for the network card through the I/O address of the network card chip and stores the updated configuration information to the BIOS flash chip to be selected to load the next time the computer starts up.

Figure 5:
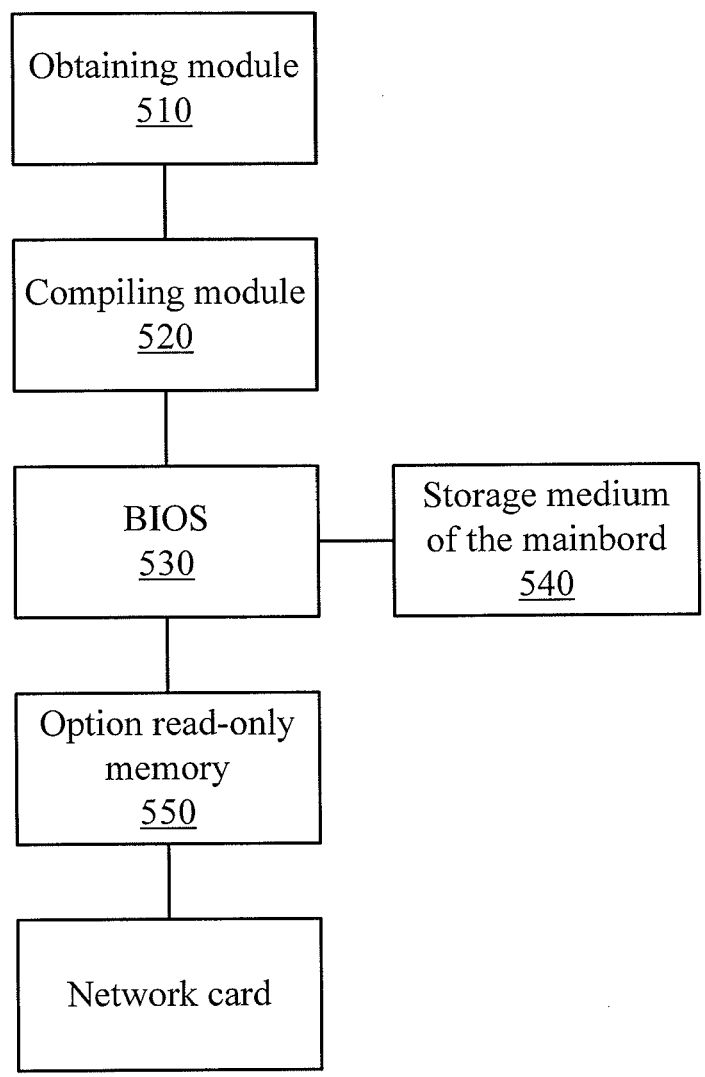
FIG. 5 is a schematic view of the composition of the first embodiment of the electronic device according to the present invention.

FIG. 5 is a schematic view of the composition of the first embodiment of the electronic device according to the present invention. In the present embodiment, the electronic device is exemplified by a computer and the network card in the computer is the function-configurable component of the present embodiment. Corresponding to the mode (1) and in conjunction with the method embodiments shown in FIGS. 1 and 2, the electronic device of the first embodiment as shown in FIG. 5 mainly comprises a obtaining module 510, a compiling module 520, Basic Input and Output system (BIOS) 530, a storage medium of the mainboard 540 and an option read-only memory (550), wherein:

the obtaining module 510 for obtaining the initial configuration information for the network card of the computer;

the compiling module 520, being connected to the obtaining module 510 and for employing the initial configuration information obtained by the obtaining module 510 as the default configuration information for the network card and compiling it into the code in the BIOS 530 during the stage of developing the BIOS 530;

the BIOS 530, being connected to the compiling module 520, and for storing the default configuration information which is compiled to the BIOS code to the storage medium 540 of the mainboard according to the calling from the option read-only memory 550 when the computer is powered on for the first time; after the computer is started up once again (including every time after the computer is powered on for the first time), for obtaining the configuration information for the network card from the storage medium 540 of the mainboard according to calling from the option read-only memory 550, and for loading the configuration information to the network card chip through an I/O address of the network card chip; and when the user updates the configuration information for the network card, for storing the updated configuration information to the storage medium 540 of the mainboard to be selected to load the next time the computer starts up according to the calling from the option read-only memory 550;

a storage medium 540 of the mainboard, being connected to the BIOS 530 and for storing the configuration information (including the default configuration information and the configuration information updated by the user) for the network card; the present embodiment illustrates by taking the CMOS chip on the mainboard as the storage medium 540; and in other embodiments, the BIOS flash chip on the mainboard may be taken as the storage medium 540 of the mainboard of the present invention;

an option read-only memory 550, being connected to BIOS 530 and for calling the service function of the BIOS 530 when the computer is powered on once again so that the BIOS 530 obtains the configuration information for the network card from the storage medium 530 of the mainboard; and for providing a network card configuration interface to accept the updating to the configuration information for the network card through the network car configuration interface and calling BIOS 530 by taking the updated configuration information as the inlet parameters for the BIOS 530; and the BIOS stores the updated configuration information to the storage medium 540 of the mainboard.

The BIOS 530 mentioned above provides a standard interruption or a system managed interruption for storing the configuration information for the network card to the storage medium 540 of the mainboard and for obtaining the configuration information for the network card from the storage medium 540 of the mainboard.

Figure 6:
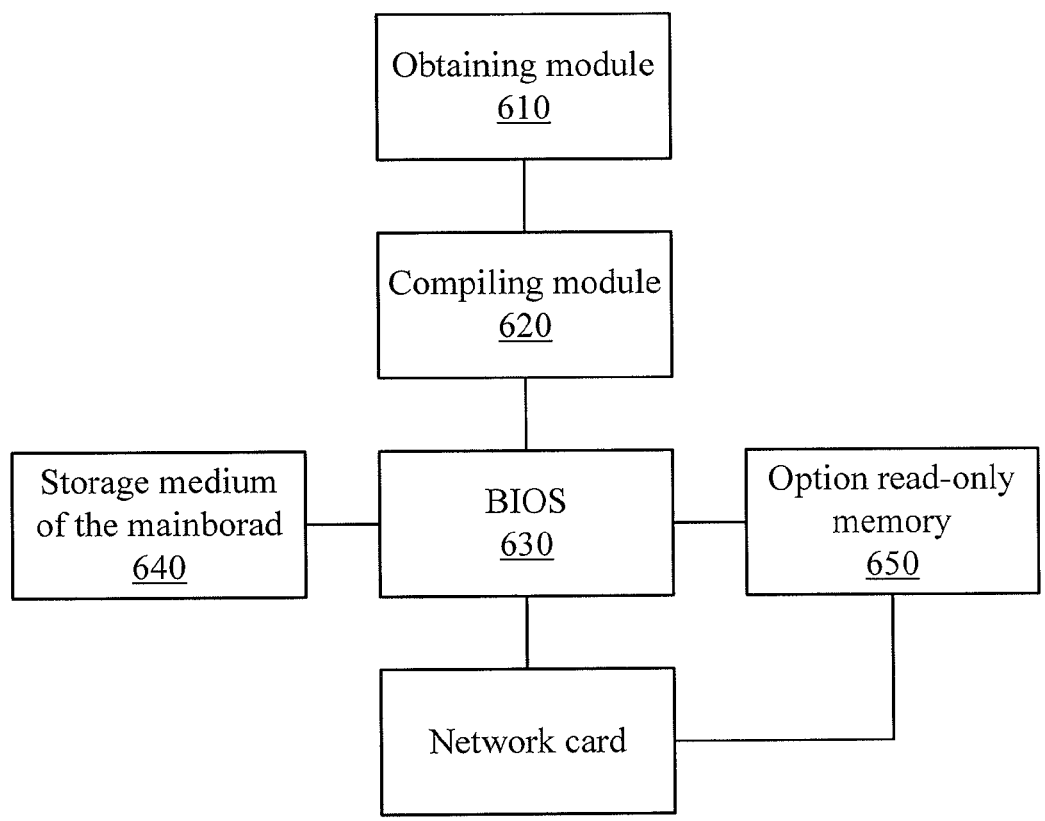
FIG. 6 is a schematic view of the composition of the second embodiment of the electronic device according to the present invention.

FIG. 6 is a schematic view of the composition of the second embodiment of the electronic device according to the present invention. In the present embodiment, the electronic device is exemplified by a computer and the network card in the computer is the function-configurable component of the present embodiment. Corresponding to the mode (2) and in conjunction with the method embodiments shown in FIGS. 3 and 4, the electronic device of the second embodiment as shown in FIG. 6 mainly comprises a obtaining module 610, a compiling module 620, BIOS 630, a storage medium 640 of the mainboard and an option read-only memory (650), wherein:

the obtaining module 610 for obtaining the initial configuration information for the network card of the computer and the I/O address of the network card;

the compiling module 620, being connected to the obtaining module 610 and for employing the initial configuration information obtained by the obtaining module 610 as the default configuration information for the network card and compiling the default configuration information along with the I/O address of the network card into the code in the BIOS 630 during the stage of developing the BIOS 630;

the BIOS 630, being connected to the compiling module 620, and for storing the default configuration information which is compiled into the BIOS code to the storage medium 640 of the mainboard when the computer is powered on for the first time; after the computer is started up once again (including every time after the computer is powered on for the first time), for reading the default configuration information from the storage medium 640 of the mainboard, and for loading the default configuration information to the network card chip through an I/O address of the network card; and when the user updates the configuration information for the network card, for obtaining the updated configuration information from the I/O address of the network card and for storing the updated configuration information to the storage medium 640 of the mainboard to be selected to load the next time the computer starts up;

a storage medium 640 of the mainboard, being connected to the BIOS 630 and for storing the configuration information (including the default configuration information and the configuration information updated by the user) for the network card; the present embodiment is exemplified by taking the BIOS flash chip on the mainboard as the storage medium 640; and in other embodiments, the CMOS chip on the mainboard may be taken as the storage medium 640 of the mainboard of the present invention; and an option read-only memory 650, being connected to the BIOS 630 and for providing a network card configuration interface when the computer runs and for accepting the updating to the configuration information for the network card through the network car configuration interface.

It should be illustrated that the technical solution of the present invention is illustrated by employing the CMOS chip on the mainboard or the BIOS flash chip as the storage medium of the mainboard of the present invention. However, it is appreciated for those skilled in the art that the CMOS chip on the mainboard or the BIOS flash chip are only the exemplary embodiments of the storage medium on the mainboard of the present invention. According to the idea of the present invention, as long as the existing storage medium on the mainboard of the electronic device may be accessed by the BIOS, they may act as the storage medium for storing the configuration information of the function-configurable component (such as the network card) to be applied to the present invention.

The present invention also provides a function-configurable component. In the first embodiment of the component, the component may be applied to an electronic device containing BIOS, the mainboard of which is provided with a storage medium. In the first embodiment of the component, the electronic device is a computer, the component is a network card, and the storage medium of the mainboard is a CMOS chip (in other embodiment it may be a BIOS flash chip). The component further comprises an option read-only memory, which is used to obtain the default configuration information for the network card by BIOS from the CMOS chip after the computer is started up, and the network card is used to load the default configuration information according to its own I/O address.

In the first embodiment of the component, the option read-only memory is further used to provide a network card configuration interface for accepting the configuration information for the network card updated by the user; and the option read-only memory also is used to call the BIOS after the user updates the configuration information for the network card; and the BIOS is further used to store the updated configuration information to the CMOS chip to be selected to load the next time the computer is started up.

In the second embodiment of the component, the component may be applied to an electronic device containing BIOS, the mainboard of which is provided with a storage medium. In the second embodiment of the component, the electronic device is a computer, the component is a network card, and the storage medium of the mainboard is a BIOS flash chip (in other embodiment it may be a CMOS chip). The network card is used to load the default configuration information according to its own I/O address and the BIOS after the computer is started up; and the BIOS is used to obtain the default configuration information from the BIOS flash chip after the electronic device is started up. In the second embodiment of the component, the network card further comprises an option read-only memory for further updating the configuration information for the component by the user and for calling the BIOS after the user updates the configuration information for the component; and the BIOS is further used to store the updated configuration information to the BIOS flash chip according to the calling from the option read-only memory.

In the technical solution of the present invention, when the BIOS flash memory is used to store the configuration information for the network card, the default state of the configuration information for the network card may be specified when the BIOS compiles, meanwhile the BIOS provides a service function of reading and writing the configuration information for the network card stored in the existing storage medium of the mainboard, which may be called by the option read-only memory for the network card or the application under OS and may conveniently implement the setting and modification of the state when leaving factory for each computers.

Among others, the BIOS provides a function of reading and writing the configuration information for the network card so that the computer in the manufacturing stage of factory are flexible called by the product line procedure so as to implement the configuration and modification of the information of the network card when leaving factory. Meanwhile the service function during runtime provides a standard interactive interface with the option read-only memory of the network card. The service function of the BIOS takes charge of reading and writing the configuration information for the network card in the storage medium on the mainboard, and the option read-only memory application for the network card calls the service function of the BIOS to implement the loading and saving of the configuration information for the network card. Thus, the BIOS service function only takes charge of reading the previously saved configuration information from the mainboard to send to the option read-only memory and saving the updated information sent from the option read-only memory to the medium of the mainboard, without knowing the particular 10 space address of the particular network card.

It should be noted that the steps as shown in the flow chart of the accompany figures may be performed in a computer system by a set of computer executable instructions and although the logic order is shown in the flow chart, the shown and described steps may be performed in a order different from the order shown therein in some situations. In addition, it should be appreciated for those skilled in the art that the respective modules or the respective steps of the present invention mentioned above may be implemented by a universal computing device, which may be centralized in a single computing device or distributed over a network composed of a plurality of computing devices. Alternatively, they may be implemented by a computing device—executable program code so that they may be stored into the storage device to be implemented by the computing device or they may be fabricated as a respective integrated circuit modules, or a plurality of modules or steps among them may be fabricated as a single integrated circuit. Thus, the present invention is not limited to a combination of any specific hardware and software.

Although the embodiments disclosed by the present invention are shown as mentioned above, the described contents are not used to limit the present invention, but to facilitate understanding of the present invention. Any modification and changes may be made in form or in detail for those skilled in the art without departing from the spirit and scope of the present invention. The scope of the present invention is only limited by the accompany claims.

What is claimed is:

1. A method of storing configuration information for a function-configurable component, the component being applied to an electronic device, which comprises steps of:
    obtaining initial configuration information for the component of the electronic device;
    employing the initial configuration information as a default configuration information for the component and compiling it into a Basic Input Output System (BIOS) of the electronic device;
    the BIOS storing the default configuration information into a storage medium of the mainboard of the electronic device when the electronic device is powered on for the first time; and
    when the electronic device is powered on once again, an option read-only memory of the component calls the BIOS to obtain the default configuration information from the storage medium of the mainboard, and loads the default configuration information to the component through an input/output address of the component.

2. The method of claim 1, wherein the method further comprises that when the user updates the configuration information for the component through an option read-only memory of the component, the BIOS stores the updated configuration information to the storage medium of the mainboard according to the calling of the option read-only memory of the component.

3. The method of claim 1, wherein the method further comprises that when the user updates the configuration information for the component through an option read-only memory of the component, the BIOS obtains the updated configuration information according to the input/output address of the component, and stores the updated configuration information to the storage medium of the mainboard.

4. The method of claim 1, wherein the method comprises steps of:
   obtaining the input/output address when the initial configuration information is obtained;
   and compiling the input/output address along with the default configuration information into the BIOS.

5. The method of claim 1, wherein the BIOS stores the default configuration information to the storage medium of the mainboard according to a standard interruption or a system managed interruption.

6. The method of claim 3, wherein the method comprises steps of:
   obtaining the input/output address when the initial configuration information is obtained; and compiling the input/output address along with the default configuration information into the BIOS.

* * * * *